US008533612B2

(12) United States Patent (10) Patent No.: US 8,533,612 B2
Hochendoner et al. (45) Date of Patent: Sep. 10, 2013

(54) USER INTERFACE FOR EMERGENCY ALERT SYSTEM

(76) Inventors: David Hochendoner, Allison Park, PA (US); Tim Means, Verona, PA (US); Charles Kollar, Pittsburgh, PA (US); Blerta Lindqvist, Pittsburgh, PA (US); William McHenry, Pittsburgh, PA (US)

( * ) Notice: Subject to any disclaimer, the term of this patent is extended or adjusted under 35 U.S.C. 154(b) by 458 days.

(21) Appl. No.: 12/795,282

(22) Filed: Jun. 7, 2010

(65) Prior Publication Data

US 2010/0313148 A1 Dec. 9, 2010

Related U.S. Application Data

(60) Provisional application No. 61/184,601, filed on Jun. 5, 2009.

(51) Int. Cl.
*G06F 3/48* (2013.01)
(52) U.S. Cl.
USPC .......... 715/759; 340/506; 340/7.26; 455/503; 455/150.1; 455/404; 715/764; 715/765; 709/224
(58) Field of Classification Search
USPC ....................................................... 715/759
See application file for complete search history.

(56) References Cited

U.S. PATENT DOCUMENTS

| | | | | | |
|---|---|---|---|---|---|
| 4,375,637 | A | * | 3/1983 | Desjardins | 340/517 |
| 6,002,748 | A | * | 12/1999 | Leichner | 379/48 |
| 6,281,790 | B1 | * | 8/2001 | Kimmel et al. | 340/506 |
| 6,320,501 | B1 | * | 11/2001 | Tice et al. | 340/517 |
| 7,184,744 | B1 | * | 2/2007 | Schnabel | 455/404.2 |
| 7,233,781 | B2 | * | 6/2007 | Hunter et al. | 455/404.1 |
| 7,277,018 | B2 | * | 10/2007 | Reyes et al. | 340/573.1 |
| 7,460,020 | B2 | * | 12/2008 | Reyes et al. | 340/573.1 |
| 8,145,748 | B2 | * | 3/2012 | Denis et al. | 709/224 |
| 8,209,392 | B2 | * | 6/2012 | Brabec et al. | 709/209 |
| 8,248,252 | B2 | * | 8/2012 | Schechter et al. | 340/584 |
| 2003/0137415 | A1 | * | 7/2003 | Thomson | 340/539.1 |
| 2005/0091368 | A1 | * | 4/2005 | Ozburn | 709/224 |
| 2005/0159132 | A1 | * | 7/2005 | Wright et al. | 455/404.1 |
| 2006/0109113 | A1 | * | 5/2006 | Reyes et al. | 340/541 |
| 2006/0139375 | A1 | * | 6/2006 | Rasmussen et al. | 345/641 |
| 2007/0207771 | A1 | * | 9/2007 | Bowser et al. | 455/404.1 |
| 2008/0048851 | A1 | * | 2/2008 | Reyes et al. | 340/506 |
| 2008/0070522 | A1 | * | 3/2008 | Marriott et al. | 455/150.1 |
| 2008/0088428 | A1 | * | 4/2008 | Pitre et al. | 340/506 |
| 2009/0075625 | A1 | * | 3/2009 | Jackson et al. | 455/404.1 |
| 2009/0118998 | A1 | * | 5/2009 | Chau et al. | 701/120 |
| 2009/0228974 | A1 | * | 9/2009 | Ivanov | 726/15 |
| 2009/0303993 | A1 | | 12/2009 | Hochendoner et al. | |
| 2009/0305659 | A1 | | 12/2009 | Hochendoner et al. | |

(Continued)

*Primary Examiner* — William Bashore
*Assistant Examiner* — Reza Nabi
(74) *Attorney, Agent, or Firm* — Fox Rothschild LLP

(57) ABSTRACT

A user interface for interacting with an emergency notification system. The user interface comprises at least one software module installed on a computer readable medium and containing instructions for operating a computer processor. The instructions comprise first instructions for causing the processor to display on a computing device display an alert selection window configured to receive a user entered alert message; second instructions for causing the processor to display on the computing device display a group selection window configured to receive a user selection of one or more notification units to receive the alert message; and third instructions for causing the processor to display on the computer device display a selection button for instructing the processor, upon selection, to transmit the alert message to the selected one or more notification units.

12 Claims, 17 Drawing Sheets

(56) References Cited

U.S. PATENT DOCUMENTS

| | | | |
|---|---|---|---|
| 2010/0048235 A1* | 2/2010 | Dai et al. | 455/518 |
| 2010/0172251 A1* | 7/2010 | Adam et al. | 370/252 |
| 2011/0184638 A1* | 7/2011 | Jouline et al. | 701/200 |
| 2012/0003952 A1* | 1/2012 | Gabriel | 455/404.1 |
| 2012/0028600 A1* | 2/2012 | Vallaire | 455/404.2 |
| 2012/0226771 A1* | 9/2012 | Harrington et al. | 709/217 |

* cited by examiner

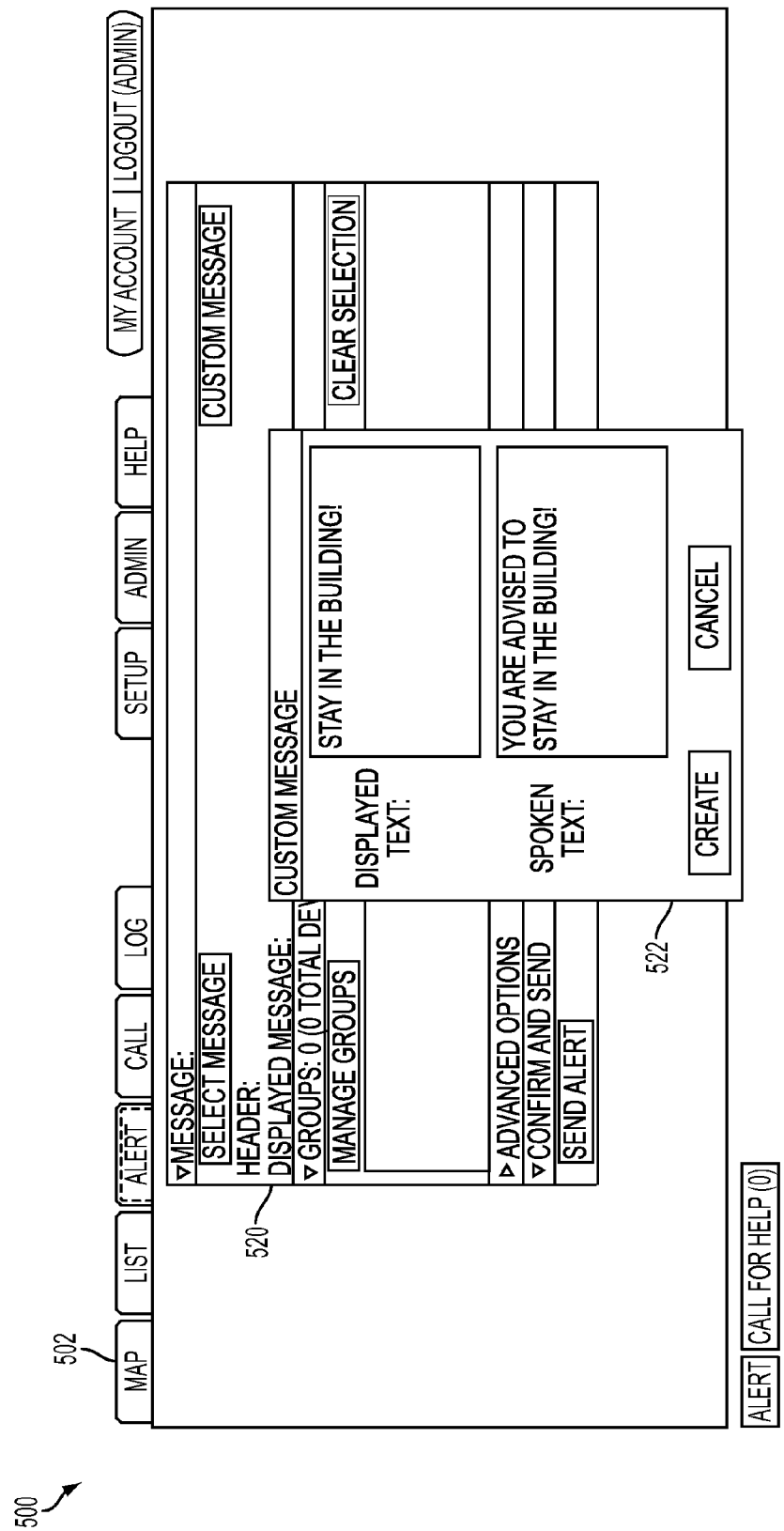

USER INTERFACE FOR EMERGENCY ALERT SYSTEM

CROSS-REFERENCE TO RELATED APPLICATION

This application claims the priority benefit of U.S. Provisional Application No. 61/184,601 entitled "User Interface for Emergency Alert System" filed Jun. 5, 2009, the contents of which is hereby incorporated by reference in its entirety.

BACKGROUND

Emergency warning systems serve as a critical link in the chain of crisis communications, and they are essential to minimizing loss in an emergency. Acts of terrorism and violence, chemical spills, amber alerts, nuclear facility problems, weather-related emergencies, flu pandemics and other emergencies all require officials such as government agencies, building managers, university administrators and others to quickly and reliably distribute emergency information to the public.

Current emergency warning systems contain many drawbacks. For example, systems that use a cellular phone network or radio broadcast network are often unable to reach individuals who are located inside of buildings. The interiors of many buildings at universities, research centers, office complexes, manufacturing plants and other locations often have very poor radio and cellular phone reception because of interference from equipment located within the building, or because of a shielding effect created by the building structure itself.

In addition, current emergency systems are not easily able to reach the right people, in the right location, at the right time. Cellular phone services, text messaging services and e-mail services can target specific individuals, but they will not be effective for a location-specific emergency because such services target individuals by phone number or e-mail address, regardless of physical location. Sirens can provide a quick alert, but they may not yield desired results because the sound may not reach all locations, and some individuals in an area may ignore a siren that provides no specific information about the emergency. Reverse 911 calling is effective for targeting a geographic location, but not everyone has a land-line telephone. People relying solely on cellular telephones would be excluded from the warning. Networks like Ethernet and WiFi are prone to failure in times of an emergency due to potential power outages shutting down the network or one or more network devices, thereby causing communication failure with an entire building or geographical area.

Additionally, user interfaces associated with current emergency systems are typically text based, and do not provide a simple interface for interacting with the emergency system. Time may be wasted in accessing the user interfaces, thereby increasing the likelihood that an emergency message may be delayed or not sent at all via current emergency systems.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this document is to be construed as an admission that the embodiments described in this document are not entitled to antedate such disclosure by virtue of prior invention. As used in this document, the term "comprising" means "including, but not limited to."

In one general respect, the embodiments disclose a user interface for interacting with an emergency notification system. The user interface comprises at least one software module installed on a computer readable medium and containing instructions for operating a computer processor. The instructions comprise first instructions for causing the processor to display on a computing device display an alert selection window configured to receive a user entered alert message; second instructions for causing the processor to display on the computing device display a group selection window configured to receive a user selection of one or more notification units to receive the alert message; and third instructions for causing the processor to display on the computer device display a selection button for instructing the processor, upon selection, to transmit the alert message to the selected one or more notification units.

In another general respect, the embodiments disclose a user interface for interacting with one or more notification units in an emergency notification system. The user interface comprises at least one software module installed on a computer readable medium and containing instructions for operating a computer processor. The instructions comprise first instructions for causing the processor to display on a computing device display a user interface window, wherein the user interface window comprises a set or one or more tabs indicating various functions that, in response to a user selection, are performed by the processor; second instructions for causing the processor to display on a computing device display a map of a geographic area covered by the notification system, wherein the map comprises information related to status information for the one or more notification units; third instructions for causing the processor to display on a computing device display, in response to a user selection to send an alert, an alert selection window configured to allow the user to enter an alert message; fourth instructions for causing the processor to display on the computing device display a group selection window configured to receive a user selection of one or more notification units to receive the alert message; and fifth instructions for causing the processor to display on the computer device display a selection button for instructing the processor, upon selection, to transmit the alert message to the selected one or more notification units.

BRIEF DESCRIPTION OF THE DRAWINGS

FIGS. 5A-5L illustrate various screenshots from an emergency alert system user interface according to various embodiments.

DETAILED DESCRIPTION

Figure 1:
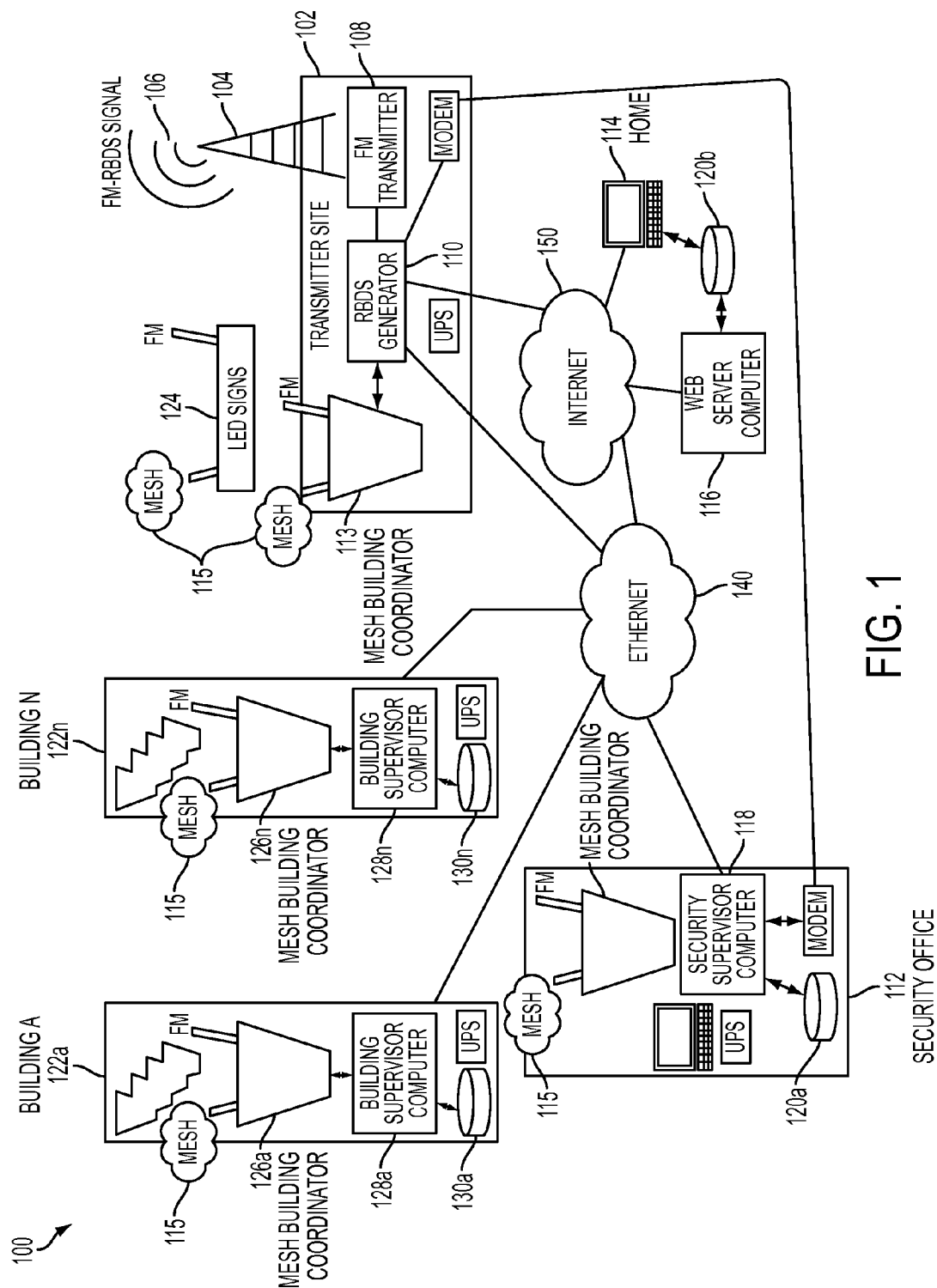
FIG. 1 illustrates a block diagram that depicts exemplary assets of a communications network according to an embodiment.

FIG. 1 illustrates an emergency notification system 100 such as the emergency notification system disclosed in U.S. patent application Ser. No. 12/479,146, entitled "Emergency Alerting Method and System," the contents of which are hereby incorporated by reference. The system may include, or it may receive signals from, a transmitter site 102 including a broadcasting tower 104 that transmits a signal 106 over public air space. The signal 106 may include a radio broadcast data system (RBDS) signal that includes data representative of one or more messages and may or may not be encrypted, depending on the application. For example, as shown in FIG. 1, the signal 106 may be generated by an FM transmitter 108 and RBDS generator 110 that converts a message received from a security office 112, home computer 114 or a web based server 116 such that it may be carried on a radio data system (RDS) subcarrier of the signal 106. Other signals capable of carrying data, such as HD radio signals, HDTV signals, and other signals that transmit data by over the air broadcast methods, may be used. Transmitter site 102 may further include a mesh coordinator 113 connected to RBDS generator 110 and configured to send a similar message via a mesh signal 115.

Security office 112 may include one or more security supervisory computers 118 connected, via a wired or wireless connection, to the RBDS generator 110. Similarly, home computer 114 or web based server 116 may connect to the RBDS generator via a wired or wireless connection. Similarly, home computer 114, web based server 116 and security supervisory computers 118 may have access to one or more of a series of databases 120a, 120b. The databases 120a, 120b may contain information specific to the emergency notification system 100 such as contact information, prepared messages and alerts, locations, building names, device locations, and various other related data such as where any hazardous materials are stored. The databases 120a, 120b may also be used by home computer 114, web based server 116 and one or more security supervisor computers 118 to establish and store a history log of all events for which notifications have been sent. This log may include who sent a notification, when it was sent, where it was sent, the status of any units receiving the notification (e.g., power status, battery life), and any additional information that may be useful in monitoring the status of the emergency notification system 100.

As used in this document, the term "home computer" does not mean that the computer need be physically located in a home, and the term "security supervisor computer" does not mean that the computer need by used by a security supervisor. Rather, the term "security supervisor computer" is used to refer to a computing device that is connected to one or more notification system databases, and the term "home computer" is simply intended to refer to a computer that is separate from the security supervisor computer.

The signal 106 may be directed to and received by receivers at multiple facilities such as building 122a and 122n. In each building 122a, 122n, one or more coordinators or mesh alerting devices 126a, 126n receive the signal 106 as an FM signal, decodes the message, formats the message and broadcasts the message to other devices in the building via a mesh network. A mesh network is a network having multiple devices configured to communicate with one another via multiple "hops", or transmissions between additional devices. This arrangement allows for continuous connection between various devices as any blocked paths or broken connections are hopped around. As a result, a mesh network has a high level or reliability. Typically, mesh networks use one of sixteen selected frequencies to broadcast information, controlled by processors in the mesh network devices. More or less than sixteen frequencies may be used dependent on the frequency band allocated for the mesh network. The individual coordinators or mesh alerting devices 126a, 126n, as well as the other devices connected to the mesh network, are discussed below in greater detail in the discussion of FIGS. 3 and 4.

Each building may also include a building supervisor computer 128a, 128b. A security office, administrator or other authorized personnel may use building supervisor computers 128a, 128n to directly send a message to receivers in the same building. Similarly, a user can utilize building supervisor computers 128a, 128n to access RBDS generator 110 via Ethernet 140 and/or Internet 150 to broadcast an emergency message via broadcasting tower 104 and/or via mesh coordinator 113 as a mesh signal 115. Each building supervisor computer may be configured to access various databases 130a, 130n. The databases 130a, 130n may include information related to the notification devices and receivers contained in each building, as well as information specific to the emergency notification system 100 such as contact information, prepared messages and alerts, and various other related data. It should be noted that only two buildings are shown in FIG. 1 by way of example only. The term "building supervisor computer" does not mean that the computer need be used by a building supervisor. Rather, the term "building supervisor computer" is used to refer to a computing device—separate from the security supervisor computer and the home computer—that may be connected to one or more notification system databases, and which may be used to generate notification messages.

Additionally, the signals 106 and 115 may be received by standalone devices such as LED sign 124 equipped with an FM receiver and/or mesh receiver. The LED sign 124 may include decoding and processing components for decoding a message contained in signal 106 and displaying any appropriate text.

Figure 2:
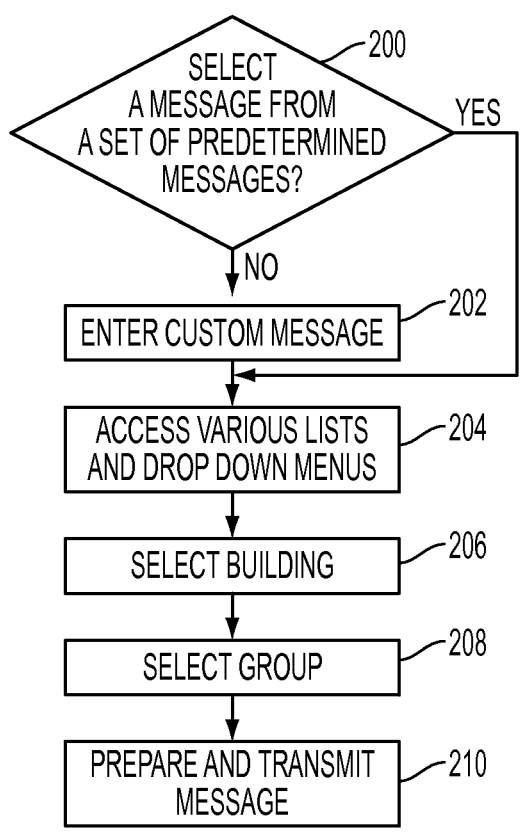
FIG. 2 illustrates a flow chart depicting an exemplary message generation process according to an embodiment.

A user may use a data entry device such as home computer 114 to create a message to be directed at a particular building, or to a group of receivers within a particular building. The message may also be intended for all buildings and device on the emergency notification system 100. Referring to FIG. 2, the user may select 200 a message from a set of predetermined messages or enter 202 a custom message. The user may then access 204 various lists and drop down menus to assist the user in selecting recipients of the message. From the lists or drop down menus, a user may select 206 a building or buildings to which the message should be directed. The user may also select all devices included in the emergency notification system. The user also may select 208 a group of one or more receiving devices within the facility. A group may be a particular geographic location such as a floor of a building, or a group of buildings/locations, such as all dormitories, all classrooms, all bathrooms, all outdoor gathering spaces, or other specific areas such as zip codes or geographic blocks created by placing a grid on a map. After the message, facility and group are selected, the message is transferred to the RBDS generator 110 via a wired or wireless connection (e.g., Ethernet 140, Internet 150, a mesh network signal, telephone, satellite connections, direct connection) and the generator may prepare and transmit 210 the message via the broadcasting tower 104 and/or via mesh coordinator 113. It should be noted RBDS is shown only by way of example, and other encoding protocols may be used, such as HD radio encoding.

The signals 106 and 115 preferably include a packet of information. The packet may include a first data bit set or sets that correspond to the location of the facility. A second data bit set or sets correspond to a group or groups within the facility. The third data bit set or sets correspond to the message itself. The order of the data bit sets described above is not required, and the packet may include this information or additional information in any order. The message can be of varying size. For example, a standard or predetermined message may simply be represented by a message code rather than the entire message, so that the receiving device can identify a message based on the code. On the other hand, a custom message may be longer and require a longer packet or multiple packets. In some embodiments, the data packet may include additional information such as the time of day, time the message was sent, the sender of the message, various conditions for the receiving device (e.g., volume levels, duration of the warning), check sum, and other applicable information. This information may be stored in the log as discussed above or sent to a third party for record keeping.

In some embodiments a data packet is broadcast multiple times to provide redundancy and give a message a better opportunity to be received.

It should be noted that the process illustrated in FIG. 2 is shown by way of example only. The order of the steps taken may be varied depending on the individual implementation of the notification system.

Figure 3:
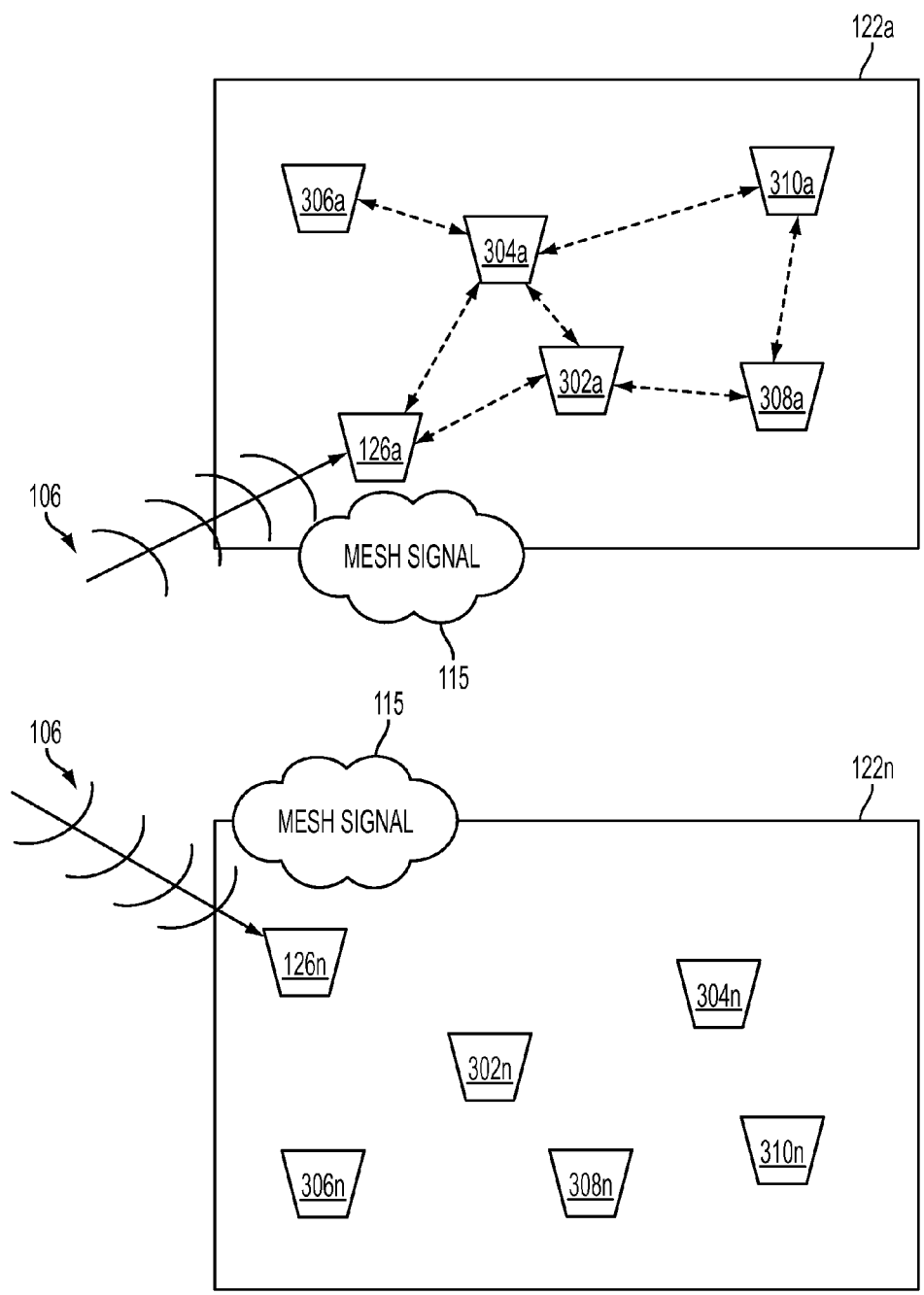
FIG. 3 illustrates an exemplary emergency alert system with multiple communication units assigned to a particular group, and communication between units within a group according to an embodiment.

Referring to FIG. 3, one or both signals 106 and 115 may be received at buildings 122*a*, 122*n*. The signals 106 and 115 are initially received by one or more coordinators or mesh alerting devices, such as devices 126*a*, 126*n* (or, alternatively, alerting units 302*a*-310*a*, 302*n*-310*n*), each having a receiver that is capable of receiving the signals. For example, coordinators or mesh alerting device 126*a*, 126*n* may each have an FM receiver that receives the signal 106 as well as a mesh transceiver that receives mesh signal 115. When the signals are received, the coordinators or mesh alerting devices 126*a*, 126*n* determine whether the signals are intended for distribution within the individual buildings. For example, signal 106 may be intended for distribution only within building 122*a*. Coordinator or mesh alerting device 126*a* may relay the data packets contained within the signal 106 to other units 302*a*-310*a* within the building 122*a* via a mesh network. Multiple units within the building may receive the FM signal and multiple units within the facility may relay the data packet to provide redundancy. When the coordinator or mesh alerting device 126*n* (or any other notification unit 302*n*-310*n*) receives signal 106 at building 122*n*, it determines the signal is not intended for that building and does not relay the message. As such, units 302*n*-310*n* do not forward the data packets amongst themselves via the Mesh network. In this manner, the signal 12 can direct messages to particular desired locations.

In other embodiments, building coordinators, such as coordinators or mesh alerting devices 126*a*, 126*n*, or alerting units 302*a*-310*a*, 302*n*-310*n*, may be configured to forward a message regardless of who the message is intended for to ensure the message is distributed to all devices on the network. Each individual receiving unit may then analyze the message to determine if they are to perform various actions in response to the message.

At least some of the communication units within each building will include both a data broadcasting system receiver, such as an FM-RBDS receiver, an HD radio receiver, and a mesh network transceiver, such as a ZigBee compliant transceiver, an IEEE 805.15.4 transceiver, or other type of mesh network transceiver. FM-RBDS is a communications protocol standard for sending small amounts of digital information using conventional FM radio broadcasts. For example, a radio station may broadcast artist and title information in an FM-RBDS transmission occurring simultaneously with a standard FM transmission of a song. ZigBee is a low-cost, low power wireless mesh networking standard. The low cost allows for wide deployment of ZigBee devices over a large geographic area, while the low-power allows the devices to use battery power for operation.

Figure 4:
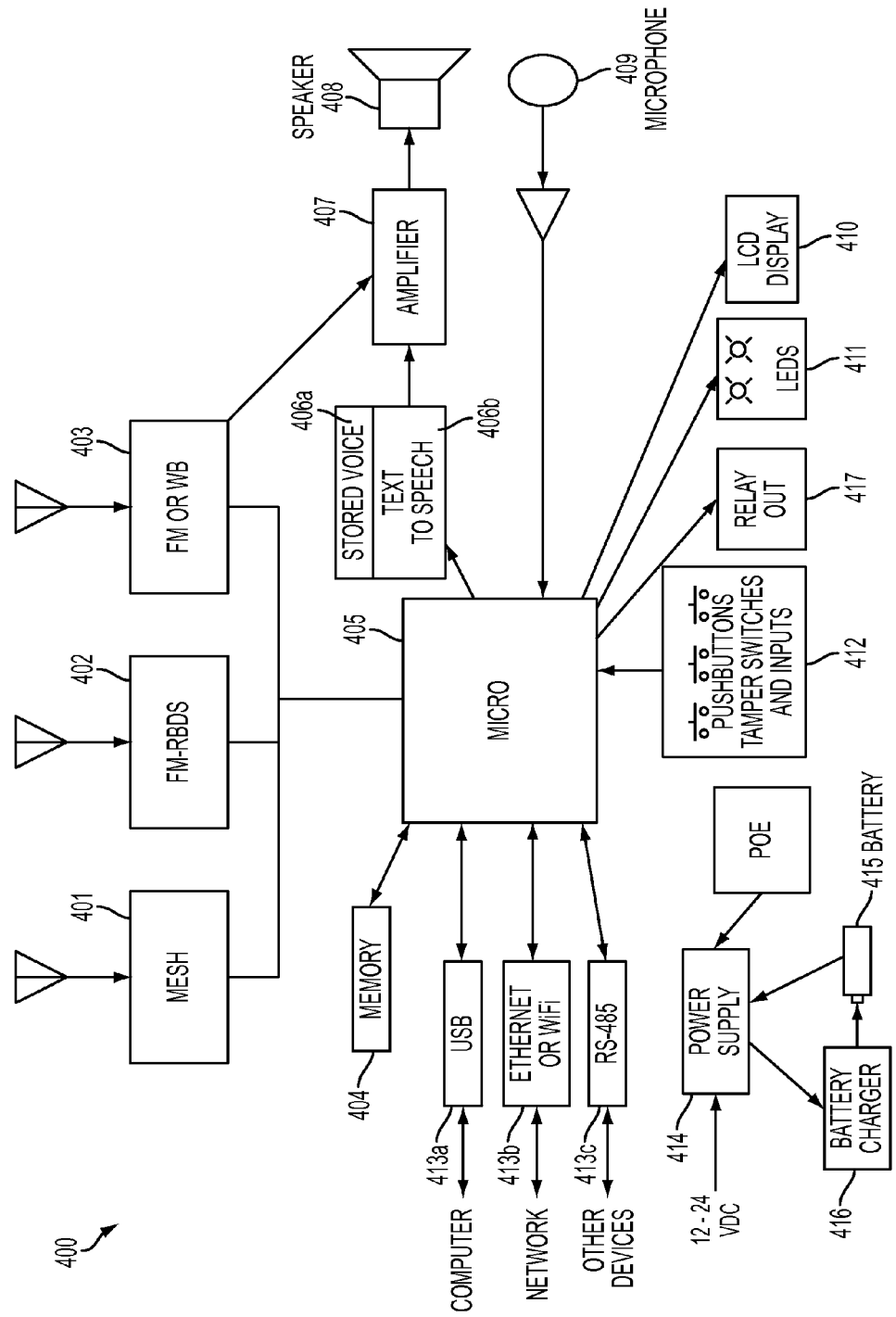
FIG. 4 illustrates a block diagram depicting various exemplary elements of a communications unit according to an embodiment.

Referring to FIG. 4, an exemplary communications unit 400 may include a mesh network transceiver 401 such as a ZigBee receiver, an FM-RBDS receiver 402 or other data broadcasting service receiver, an additional receiver for receiving analog or other communications such as an FM receiver and/or weather band receiver 403 configured to use specific area message encoding and/or emergency alert system messages. By providing a second receiver capable of receiving FM signals, the device may monitor two separate FM frequencies for emergency alerts, thereby increasing the redundancy of the device. All of the receivers and/or transceivers may be in electronic communication with a microprocessor 405 that analyzes a received data broadcasting service signal. The units may also include a memory 404 that stores a unique identifier for each unit, including a group component and a device component so that each unit can be uniquely identified and associated with a group of other units, such as units within a structural element and/or building. The memory 404 may store software related to the operation of the unit 400. This software may be updated regularly via both mesh and FM transmissions. For example, a message may contain a large number of packets, each packet containing a portion of an update to the software to be received and installed by unit 400. The memory may also store a set of alerts or pre-recorded messages, each with a unique message code. The memory may be a low-power, compact memory device such as an EPROM, EEPROM, a flash memory storage device, or RAM, however, it should be noted these types of memory are given by way of example only.

Once a data packet is received at one of the receivers or other communication ports of unit 400, the microprocessor may analyze the building and group components of the data packet to determine whether the data packet includes a message intended for the group or groups to which the communications unit belongs. If so, the unit 400 may relay the packet to other units within the facility via a mesh network transceiver 401 or other communication components (e.g., various communication ports). The unit also may present the alert component of the message via a display 410 (e.g., an LCD display), via one or more lights such as light emitting diodes (LEDs) 411 which may or may not strobe, or via an amplifier 407 and a speaker 408. Another potential output is relay out 417, which can activate an external device such as an additional siren or light.

It should be noted that LEDs 411 may be configured to indicate multiple levels of alerts. For example, the LEDs 411 may emit a blue light to indicate the unit is functioning properly. An amber light may indicate an event that requires a low level of response, such as a notification a building will be closing soon. The LEDs 411 may emit a red light when there is an emergency such as a fire or other natural disaster.

Audio messages may be presented based on the content of the message portion of the data packet. The processor may include program instructions that instruct the processor, upon receipt of the data packet, to identify the message code, access the memory 404 to determine whether a prerecorded message corresponds to the message code, and if so, load the prerecorded message from stored voice memory 406a and output the stored voice via the amplifier 407 and speaker 408. Similarly, the processor 405 may be instructed to compose a sentence of various spoken words contained in the stored voice memory 406a for outputting. If a prerecorded message or appropriate stored voice is not available, the processor may be instructed to direct the message portion of the data packet to a text to speech converter device 406b, the output of which is then directed to the amplifier 407 and speaker 408. Audio messages corresponding to the non-data FM signal also may be presented, based on the FM audio transmission.

In some embodiments, referring back to FIG. 1, the home computer 114, web based server 116 and security supervisory computers 118 may be configured so that only individuals with certain authorization levels can prepare custom messages, while other individuals are limited to prerecorded messages. In many embodiments, the user must enter some authorization code before transmitting any message at all over the service Referring back to FIG. 3, all of the units are preferably located within the communication range of at least one other unit within the applicable group so that all units may receive and/or transmit messages with at least one level of redundancy. In addition, not all units need be equipped with FM receivers. In particular, some units, such as those located on the interior of a building where FM reception is poor, may be equipped only with mesh network transceivers to reduce costs.

As shown in FIG. 4, some or all communication units may be equipped with an FM receiver 403 or other receiver that allows reception of live broadcasts and audio presentation of the broadcast through the amplifier 407 and speaker 408. This may be used, for example, in a situation where the alert message instructs individuals located near the unit to tune to an FM or weather band broadcast signal for more detailed information. In response to a message, unit 400 may turn on all related components and broadcast an emergency message received via the FM receiver 403.

Unit 400 may also include a series of input devices such as microphone 409, pushbuttons, tamper switches and inputs 412, and various data communication interfaces such as USB port 413a, Ethernet port 413b and RS-485 port 413c. Microphone 409 may be operably connected to a signal processing component configured to receive analog signals from the microphone and convert the analog to digital signals. The audio may be compressed to balance ambient sound, adjusted for ambient sound and/or a person's speech level, then converted to data for transmission. The push buttons may be used to signal an emergency directly at an individual unit. In combination with the microphone 409, a person may use unit 400 to notify security of a problem, while transmitting voice to indicate the reason for calling for help. The tamper switches 412 may be configured to indicate when a unit has been opened or removed from its location. Additional inputs may include a gas sensor for detecting air quality and any potential hazardous materials, a fire or smoke detector, a motion detector, a camera, and any other suitable device for providing an signal or reading indicative of current conditions in a specific environment.

The unit 400 may further includes a power supply 414 configured to run on direct current, such as that produced by a AC/DC converter. The unit may also have an internal battery 415 and battery charger 416 such that when DC power is lost, the unit may continue to function normally. The unit 400 may self-monitor the power supply 414 and battery 415, along with various other functions (e.g., receiver functionality) in real time and alert one or more of the building coordinators if the unit is malfunctioning.

It should be noted that unit 400 is shown by way of example only. Additional units may be used which incorporate only a set of components used in unit 400. For example, a smaller unit may be designed to be powered by a battery only. The smaller unit may have fewer features such as lights and display screens to increase the life of the battery.

Referring again to FIG. 3, the units within a group such as building 122a may not only relay messages, but they may interrogate each other by sending poll signals and receiving acknowledgement responses. A host unit may collect all of the responses and determine whether any of the individual units may exhibit loss of power or other malfunctions by determining whether any expected devices have not responded. If a device has not responded, the host unit may generate an alert such as a visual message or audible signal, or it may send a communication back to a remote monitoring device where the alert may be monitored by one or more additional devices and/or monitoring personnel.

In some embodiments, one or more of the communication units 400 may be equipped with components that measure the strength of a signal. If signal strength suddenly changes, the unit may generate an present via the display and/or audio device and/or ZigBee transceiver an alert indicating a potential for hacking or jamming the network.

FIGS. 5A-L show various screenshots of an exemplary user interface 500 configured to interact with an emergency notification system such as emergency notification system 100. The user interface 500 may include various modules or software components stored on a computer readable medium operably connected to one of the various computing devices of emergency notification system 100 such as home computer 114, web based server 116 and security supervisory computers 118.

Figure 5A:
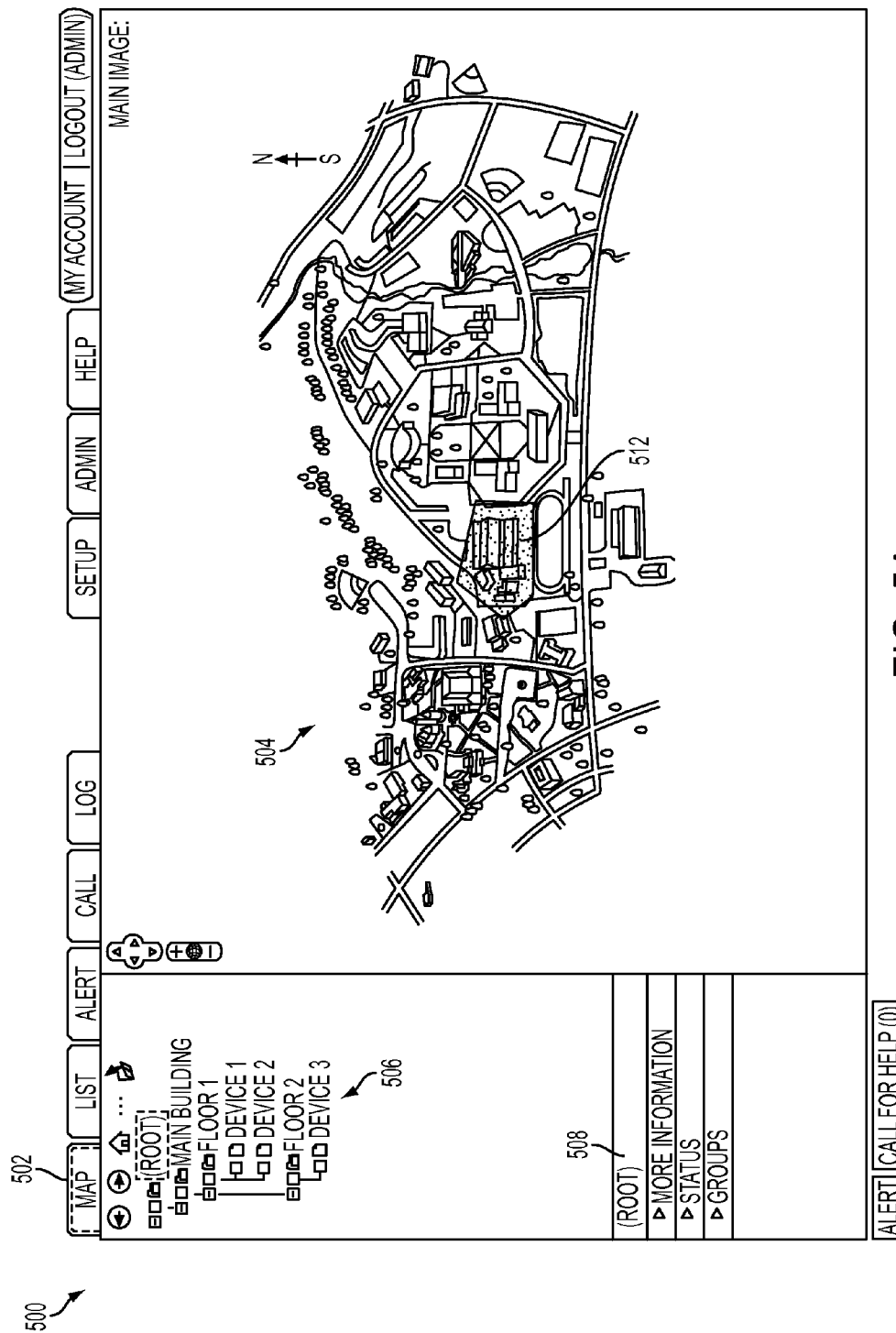

FIG. 5A shows an exemplary screenshot of the user interface 500. The user interface 500 may include a set of tabs 502 or other user selectable areas map configured to alter the user interface and switch between various views or functions. For example, as shown in FIG. 5A, the set of tabs 502 include map (currently selected), list, alert, call, log, setup, admin, and help. It should be noted this set of tabs 502 is shown by way of example only, and may vary depending on the implementation of the notification system. Additionally, the set of tabs 502 may change depending on the credentials of a user accessing the notification system. For example, if a user is classified as an administrator, the user may have access to all functions of the system. For example, an administrator may be able to edit details of the system, setup new user accounts, and access record and log files containing secure information. However, if the user is classified as an operator, the user may have limited access to a subset of functions. For example, if a user classified as an operator logs on to the notification system and accesses the user interface 500, the set of tabs 502 may be limited to map, list, alert, call, and log.

As shown in the exemplary screenshot of user interface 500 illustrated in FIG. 5A, the tab labeled "map" may be selected from the set of tabs 502, thus displaying a map 504. In this exemplary embodiment, the area shown in an exemplary map 504 may illustrate the coverage area of the emergency notification system as installed on a college campus. However, any other area that includes multiple buildings equipped with emergency notification devices may be shown in the map 504. For example, the map 504 may show an office park, industrial facility, neighborhood, city block. hospital, other campus, or other group of buildings. The locations of various buildings such as classrooms, dormitories, lecture halls, common areas, dining halls, sporting venues, and other related buildings as well as the general location of various emergency notification system units (e.g., unit 400) may be shown on the map 504. It should be noted the type of buildings shown on the map may vary depending on the area covered by the notification system. Various areas on the map, such as building 512 and the surrounding area, may change color or flash depending on the status of the area or any notification units located within that area. A scale or key may be provided indicating what each color or flashing notification means. For example, if building 512 is green, that may indicate the status of the area is normal. If building 512 is red, that may indicate an alarm has been activated in the area.

The user interface 500 may provide the user with the ability to select a portion of the map 504 to zoom in or out on, providing a higher level of detail. The user may select a portion of the map 504 by clicking, double clicking, selecting an icon on the map, pressing a particular key on another input device, or via any additional similar input means. Similarly, the user interface 500 may provide the user with the ability to scroll around the map by clicking and dragging on the map, selecting an icon on the map, pressing a particular key on another input device, or via any additional similar input means. The map 504 may also include a marker such as a flag. The flag may indicate an area of concern, mark a selected building, or mark a general area of interest. The user interface 500 may include an icon that positions the map 504 directly onto the flag, or allow the user to manually locate and zoom in on the flag. Various other features common to interactive maps may be incorporated into the user interface 500 and will not be discussed in additional detail.

Various objects such as buildings and notification units may be organized and displayed in a tree data structure 506 displayed in the user interface 500. The tree data structure 506 may be organized into a root map, or highest level map, having various branches representing individual buildings or areas of interest on the map 504. In this example, the root level has one branch labeled "Main Building." The branch "Main Building" has two branches, "Floor 1" and "Floor 2." The branch "Floor 1" has two leaves labeled "Device 1" and "Device 2" representing individual notification units located on floor 1 of the main building. Similarly, the branch "Floor 2" has one leaf labeled "Device 3" representing a single notification unit located on floor 2 of the main building. The tree data structure 506 may provide a quick visual representation of all notification units and their locations. A user may quickly access an individual unit by clicking on its name in the tree data structure 506, allowing the user to quickly determine the status of that individual unit. Additionally, if a user selects a notification from the tree data structure the map 504 may adjust to focus directly on that location, providing the user with an accurate visual location of the notification unit. Additional features may be incorporated into the tree data structure 506 such as selecting multiple branches and/or leaves, modifying the text of a branch of leaf name if selected (e.g., the text is bold if selected), and other related features.

It should be noted the tree data structure 506, and the individual branches and leaves included on the tree data structure, are shown by way of example only. Each notification system may have a unique tree data structure specific to the topography of the notification system.

The user interface 500 may also include a system information window 508. The system information window 508 may provide a text based representation of additional information related to individual notification units such as status and group.

Figure 5B:
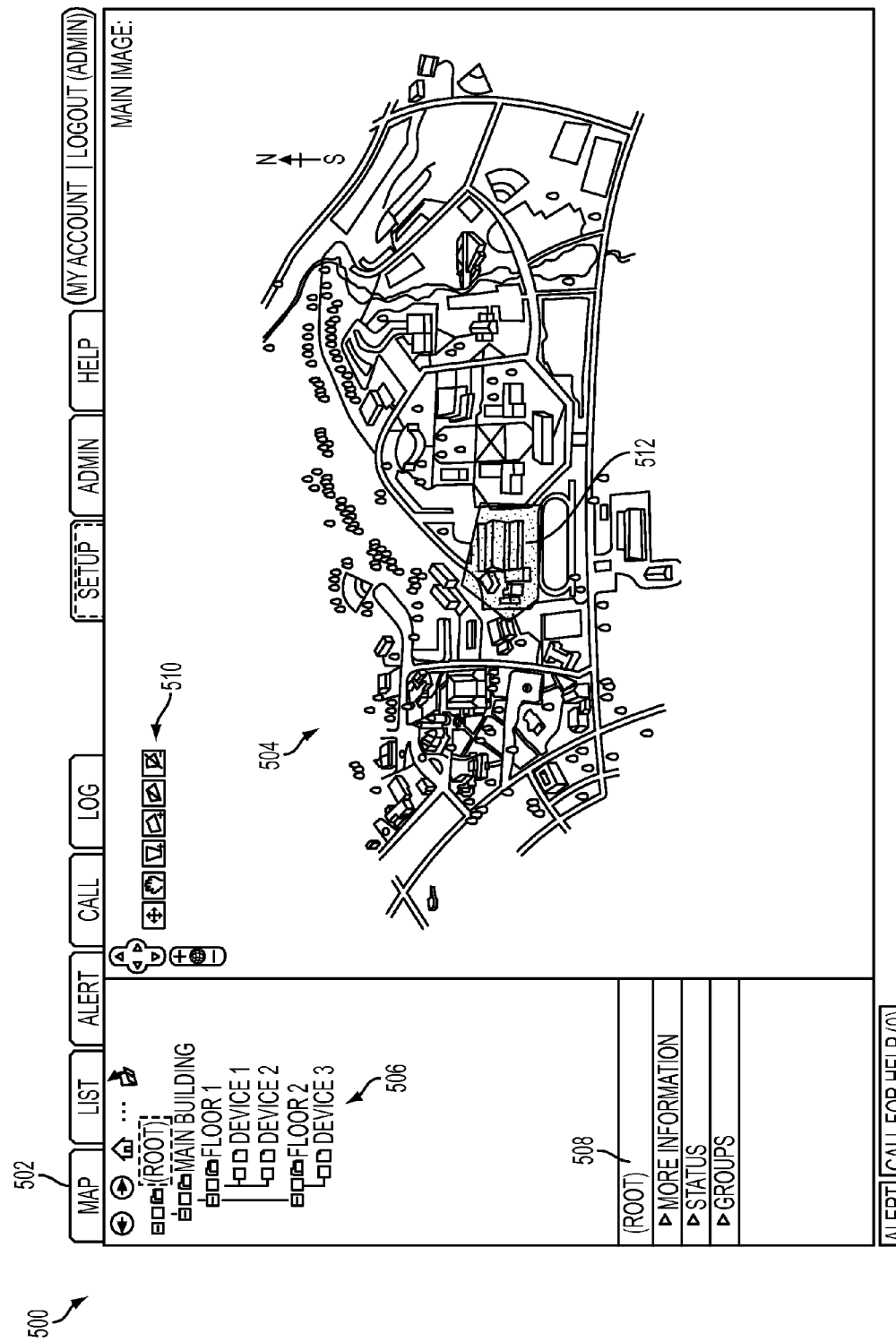

FIG. 5B illustrates a second screenshot of user interface 500 in which the setup tab from the set of tabs 502 has been selected, thus providing a user with the ability to alter the information related to the notification system displayed in map 504. Initially, a user may import a scanned or digital image of the map 504 showing an area covered by the notification system. In the setup window, the user may be provided with a set of tools 510. Using the set of tools 510, the user may overlay an image or canvas layer on top of the image of the map 504. On the canvas layer, the user may use the set of tools 510 to define various buildings, notification units, and additional information related to the notification system on the map 504. In this example, an outline of building 512 has been added to the canvas layer, thereby defining the location of building 512. Additionally, the user may define various aspects of the building such as name, hazardous materials stored nearby, number of notification units within the building, and other relevant information. The user may also define various visual effects for the building such as color scheme or flashing patterns to indicate the status of the building.

During the installation and setup of the notification system, each notification unit installed may be identified via a global position system (GPS) device to determine its exact location. This information may be transferred to the map 504 during setup of the user interface 500 to provide accurate locations on the map of all the notification units. Additionally, the setup may provide a user with the option to enter unit specific details such as where is the unit located, are there any hazardous materials located nearby, what are the display capabilities of the unit, and any other relevant information.

Figure 5C:
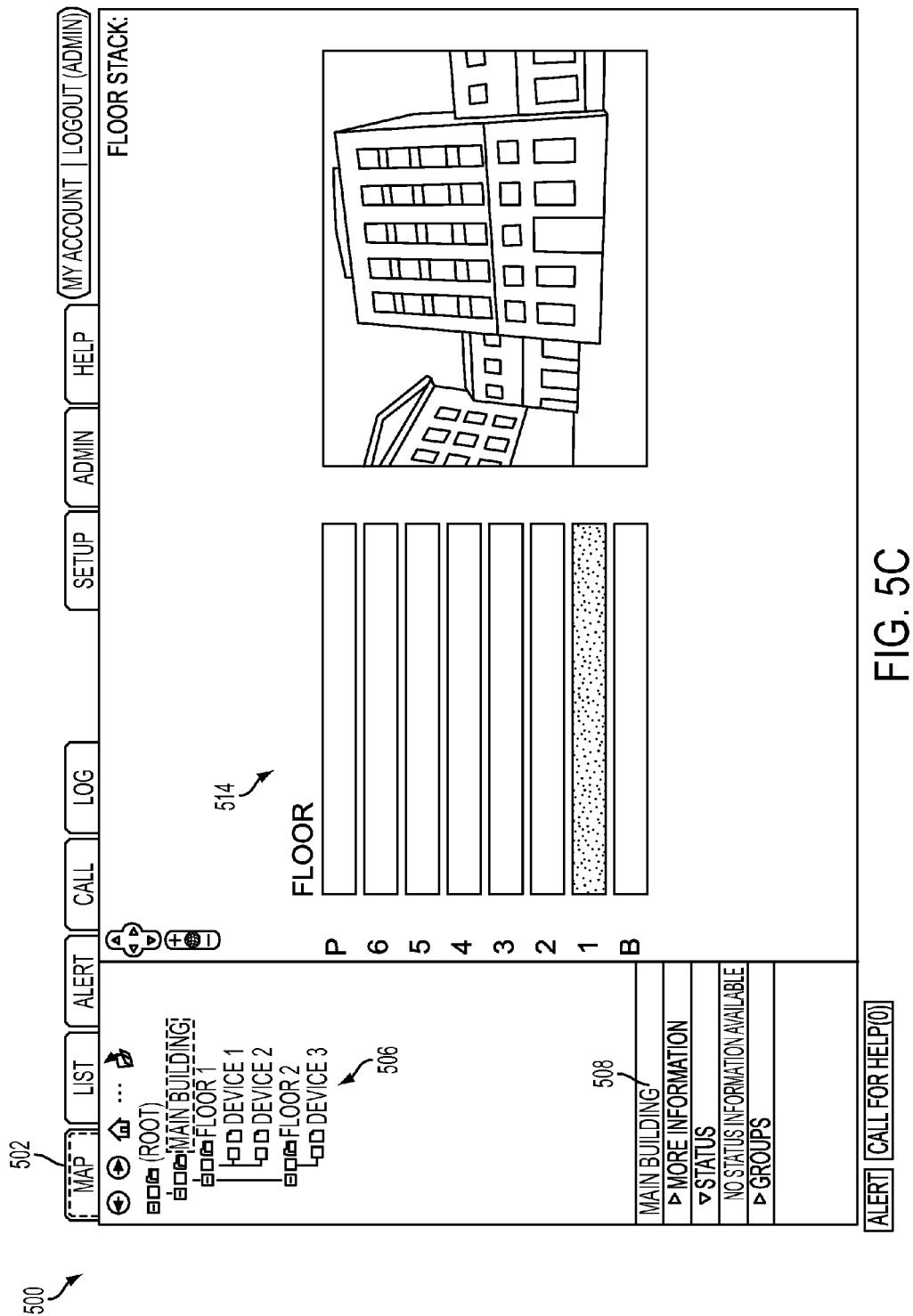
Figure 5D:
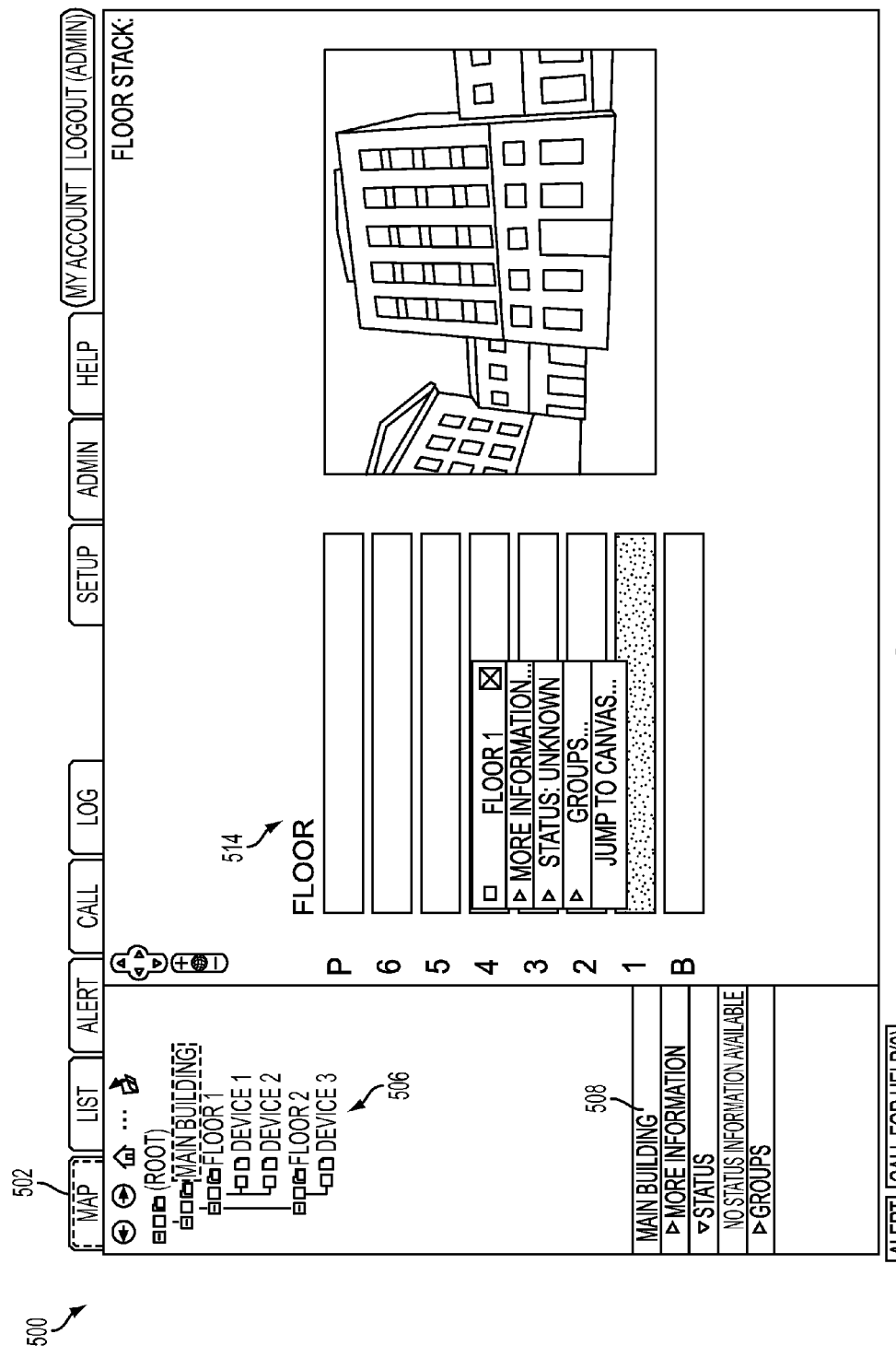

As shown in FIGS. 5C and 5D, if a user selects a specific building from the map 504 or the tree data structure 506, the user interface may update to show a view of the selected building. The view of the map 504 may be replaced by a detailed building view 514 showing each floor of the selected building along with specific information related to the building. As shown in FIG. 5D, if a user selects a specific floor (e.g., floor 1) details related to that floor may be displayed. A pop-up window may include the various details related to that floor, such as status of the building, floor or unit, names of occupants, phone numbers, hazardous materials stored on that floor, or any other relevant information.

Figure 5E:
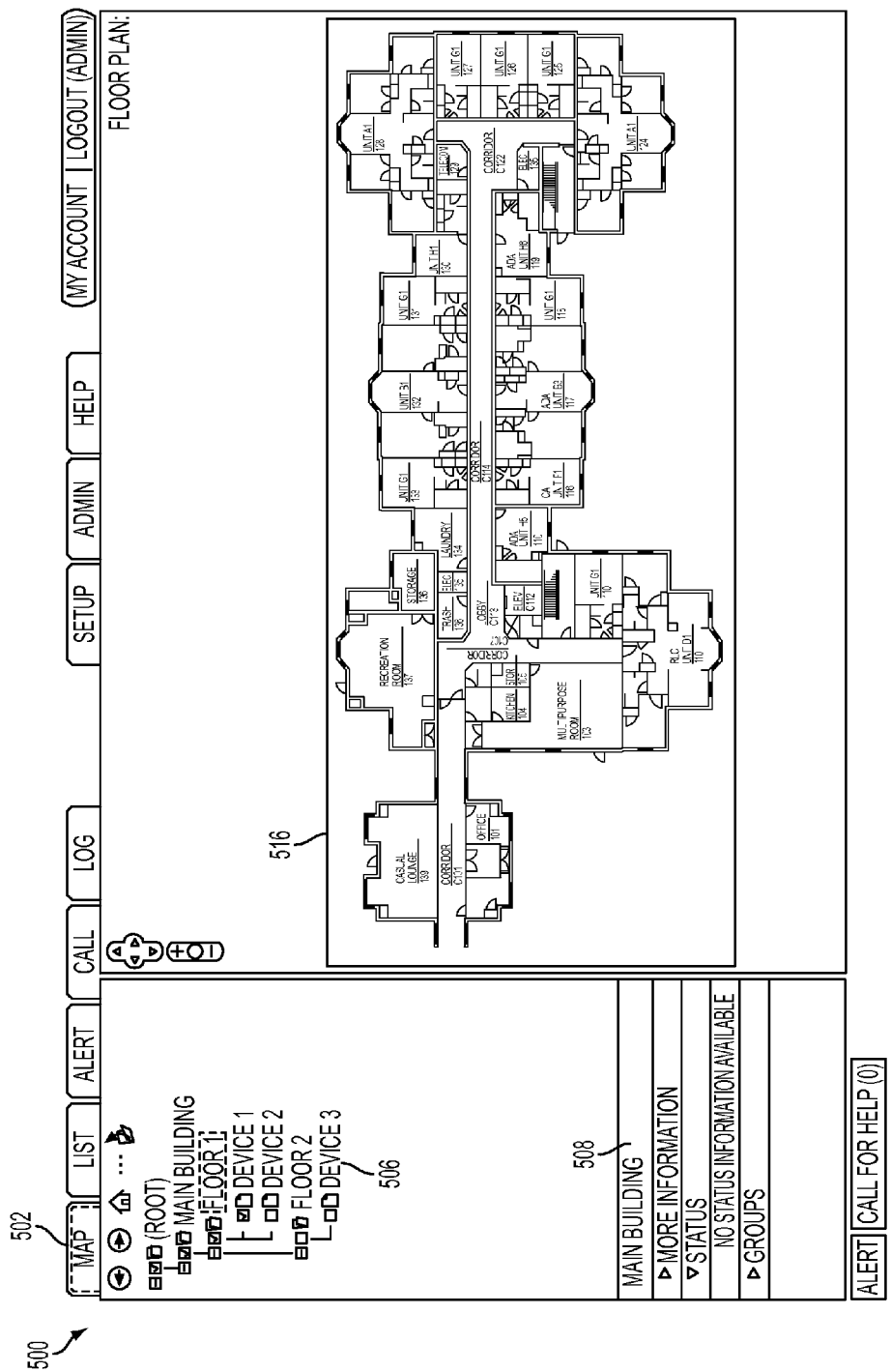
Figure 5F:
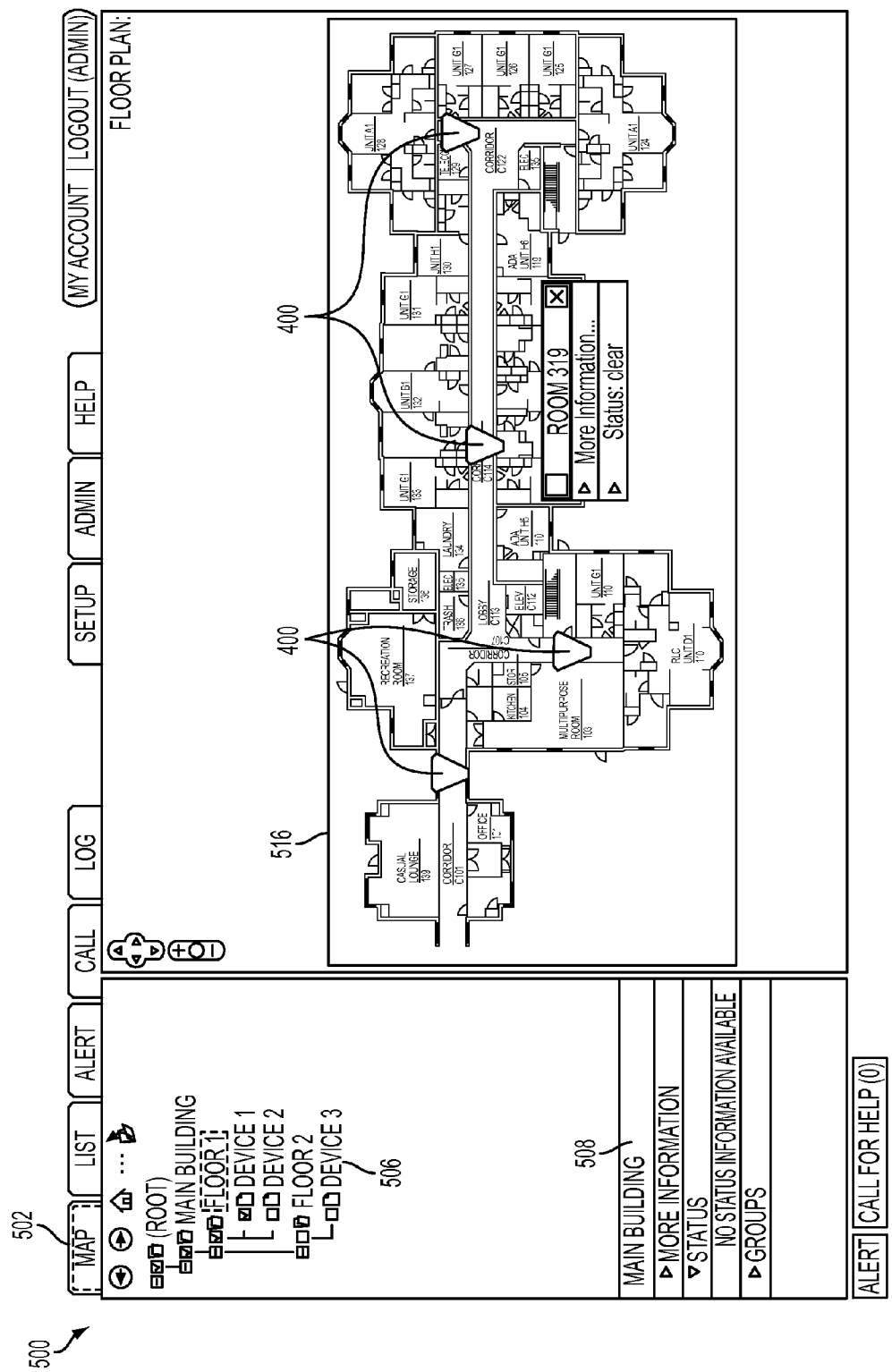

As shown in FIG. 5E, upon selection of an individual floor a detailed map 516 may be displayed showing a view of that specific floor. Any notification units located on that floor may be displayed along with any information related to the notification units located on that floor. FIG. 5F shows an exemplary detailed map 516 showing various notification units 400 located on a specific floor. Each notification unit 400 may be represented by a dynamic icon placed on the detailed map 516 indicating the location of the notification unit. This icon, or its color and/or size, may change based upon the status of that unit. An exemplary key of icons may be include, the key listing several possible icons that may be displayed. For example, icons may include normal activity, a selected unit, an alert has been sent, trouble in building, in alert status, offline, and help requested. Similar to the pop-up window shown in FIG. 5D, if a user selects a specific room (e.g., room 319) or a specific notification unit, details related to that room or notification unit may be displayed in a pop-up window. The details may include the various details related to that room or notification unit, such as status, names of occupants, phone numbers (of the room), hazardous materials stored in that room, or any other relevant information.

Figure 5G:
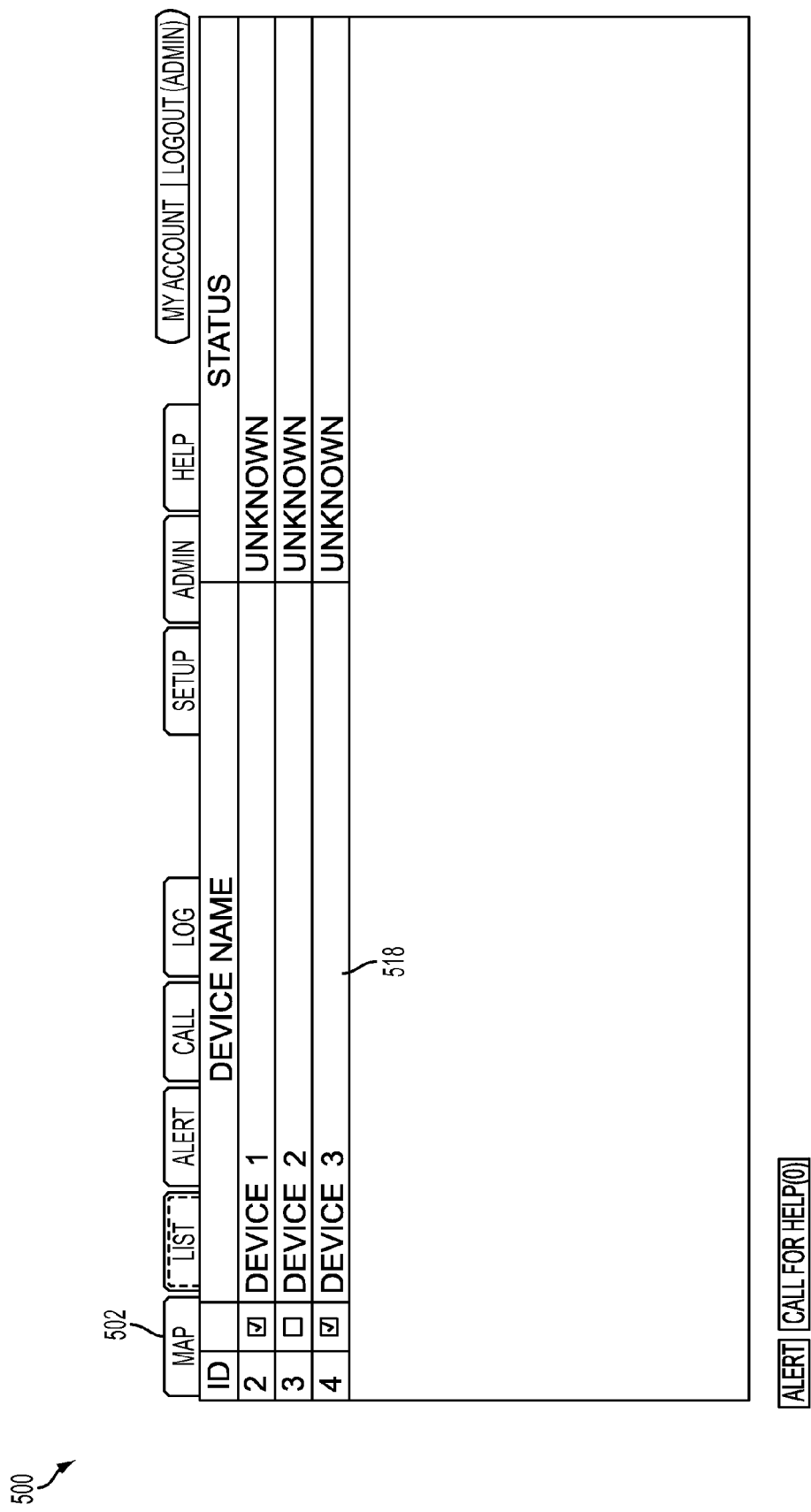

As shown in FIG. 5G, a user may select the tab labeled "list" from the set of tabs 502. Upon selection of the list tab, a notification unit list 518 may de displayed listing each notification unit (e.g., device 1, device 2 and device 3 as shown in FIG. 5G) as well as the status of each notification unit. The user may select an individual notification unit, or multiple units to obtain additional information about the units or to send an alert to the units.

FIG. 5H illustrates a screenshot of user interface 500 where a user has selected the tab labeled "alert" from the set of tabs 502. Upon selection of the alert tab, an alert selection window 520 may be displayed. The alert selection window 520 may provide the user with the option to select a single preprogrammed message, select multiple preprogrammed messages, or to enter a custom message. If the user selects to enter a single or multiple preprogrammed messages, a drop-down menu may be displayed including a list of alerts, or a similar selection window may be displayed. If the user selects to enter a custom alert, a custom message window 522 may be presented allowing the user to type in a text message for display. The text message for display may be limited to a set number of characters, however, any limitations on the text entered may be dependent on the implementation of the emergency notification system and the capabilities of the individual notification units. Additionally, the alert selection window 522 may provide a text box for entering a spoken text warning as well. As with the text message, the spoken warning may be limited to a set number of words or phrases. Depending on the capabilities of the individual notification units, the spoken text may vary between notification systems and units. After entering in a custom alert, or using one or more of the preprogrammed alerts, a user may select to create the custom alert.

Figure 5I:
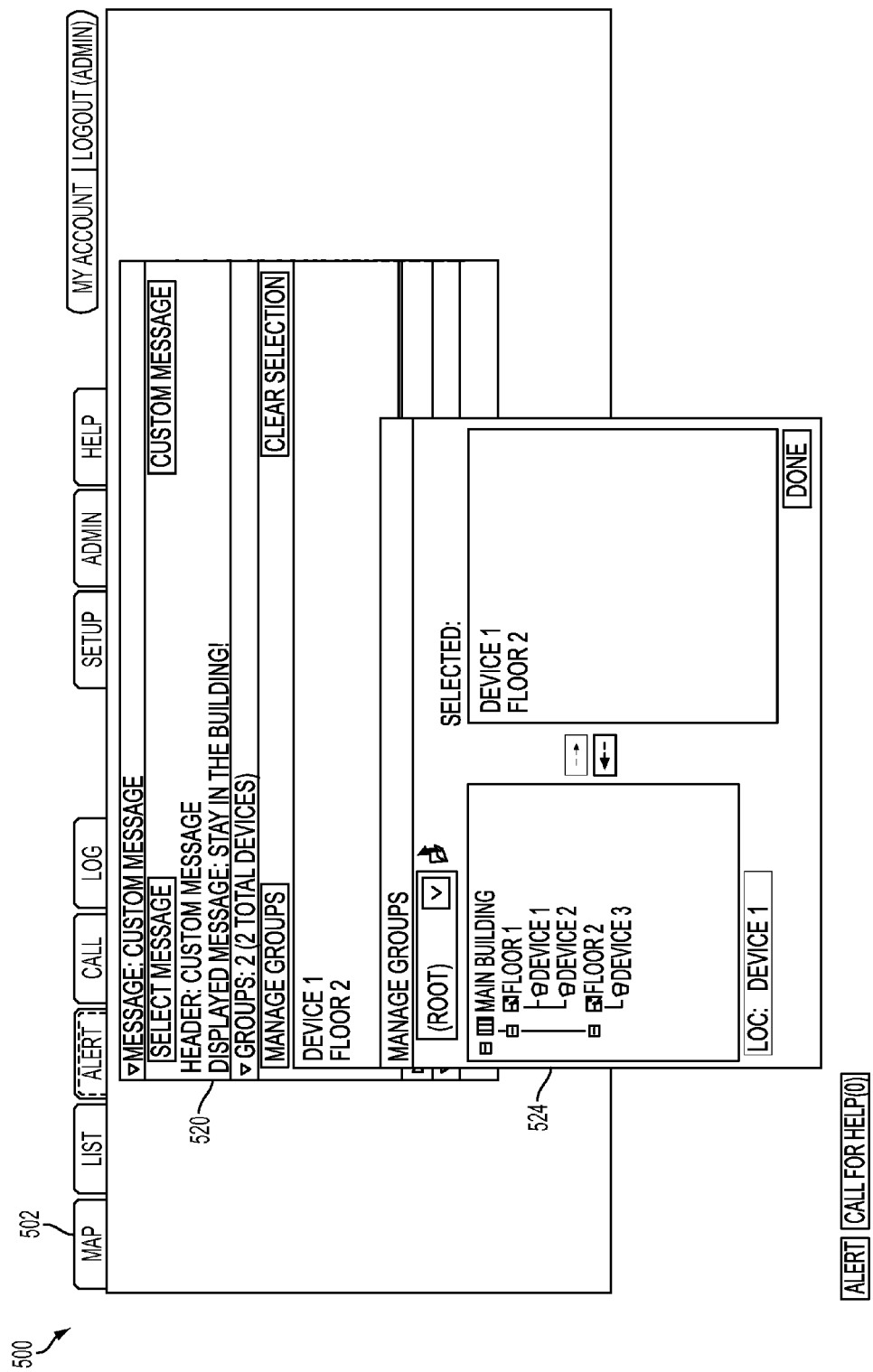

As shown in FIG. 5I, after selecting to user a preprogrammed alert or to create a custom alert, a user may select one or more notification units to receive the alert via the alert selection window 520, by selecting locations or notification units on the map 504, or by selecting locations of notifications on the tree data structure 506. The alert selection window 520 may provide the user with the option to select all units, an individual unit, or a group of units. If the user opts to select a group of units, a group management window 524 may be displayed. In the group management window 524, the user may have the option to select various buildings, groups, or individual notification units from a similar tree data structure as that of tree data structure 506. Likewise, a user may select one or more groups of the notification units, one or more buildings, or one or more individual notification units from the map 504. For example, a user may select all devices, all rooms of a certain type (e.g., all dorm rooms), or an individual building. Selecting an individual building may result in additional choices, such as all rooms in that building, or specific areas of the building. Once the user has selected the intended notification units to receive the alert, the user may close the group management window 524.

Figure 5J:
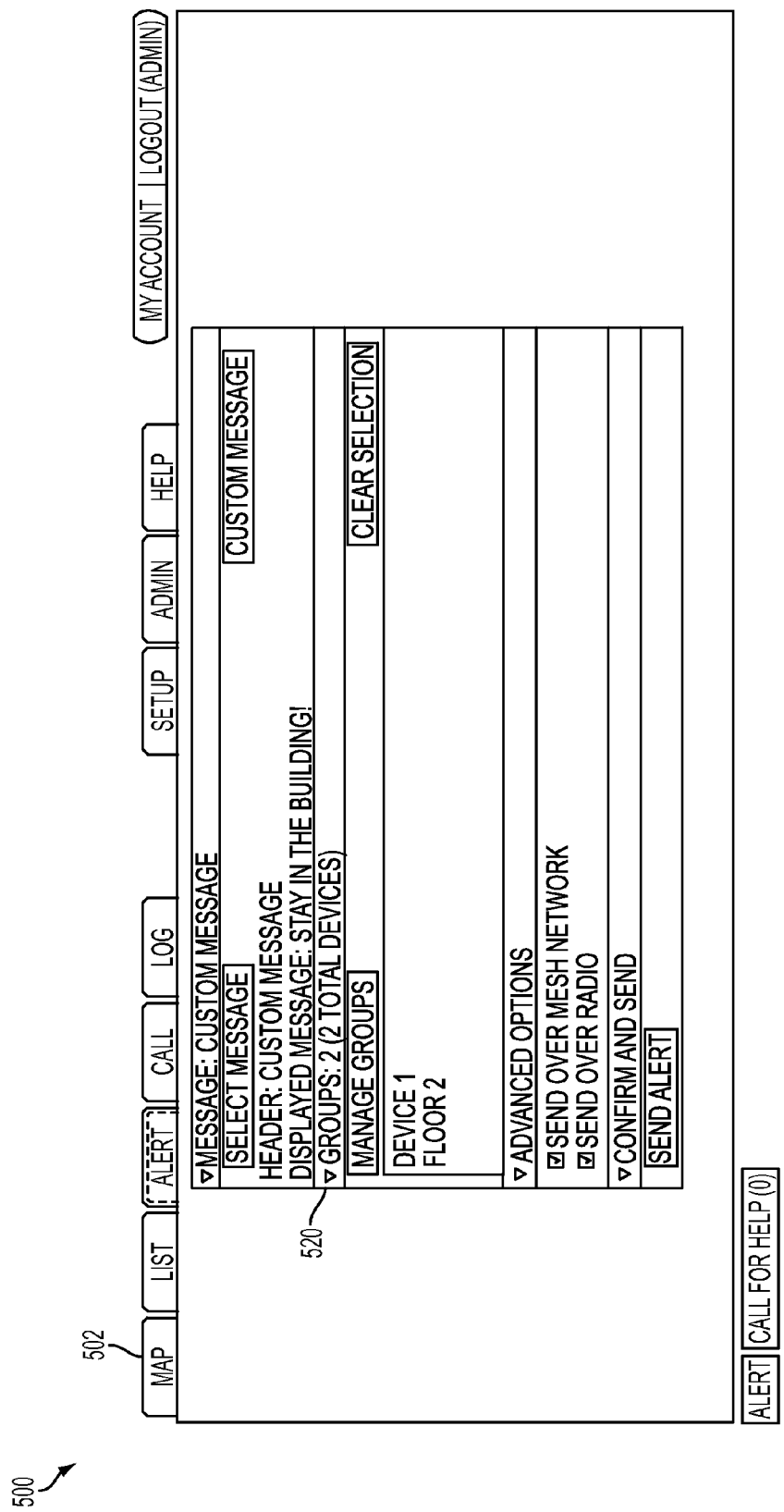

As shown in FIG. 5J, once the user has selected the alert to be broadcast, and the notification units to receive the alert, the user may be provided with additional options such as to send the alert via the mesh network, send the alert via the radio network, or to send the alert via both networks. Once the user has select the network to broadcast the alert, the user may confirm and send the alert by selecting a send alert button.

After selecting send alert button, a verification window may be displayed. Depending on the security integrated into the user interface 500, a user may be requested to enter their username and password, and confirm that they wish to send the alert. An administrator of the emergency notification system may maintain usernames and passwords for authorized users such that all alerts generated with user interface 500 are genuine emergency notifications. Additional security such as biometric protection, secure locations for computers permitted to run user interface 500, and other security steps may be taken depending upon the implementation of the emergency notification system.

Figure 5K:
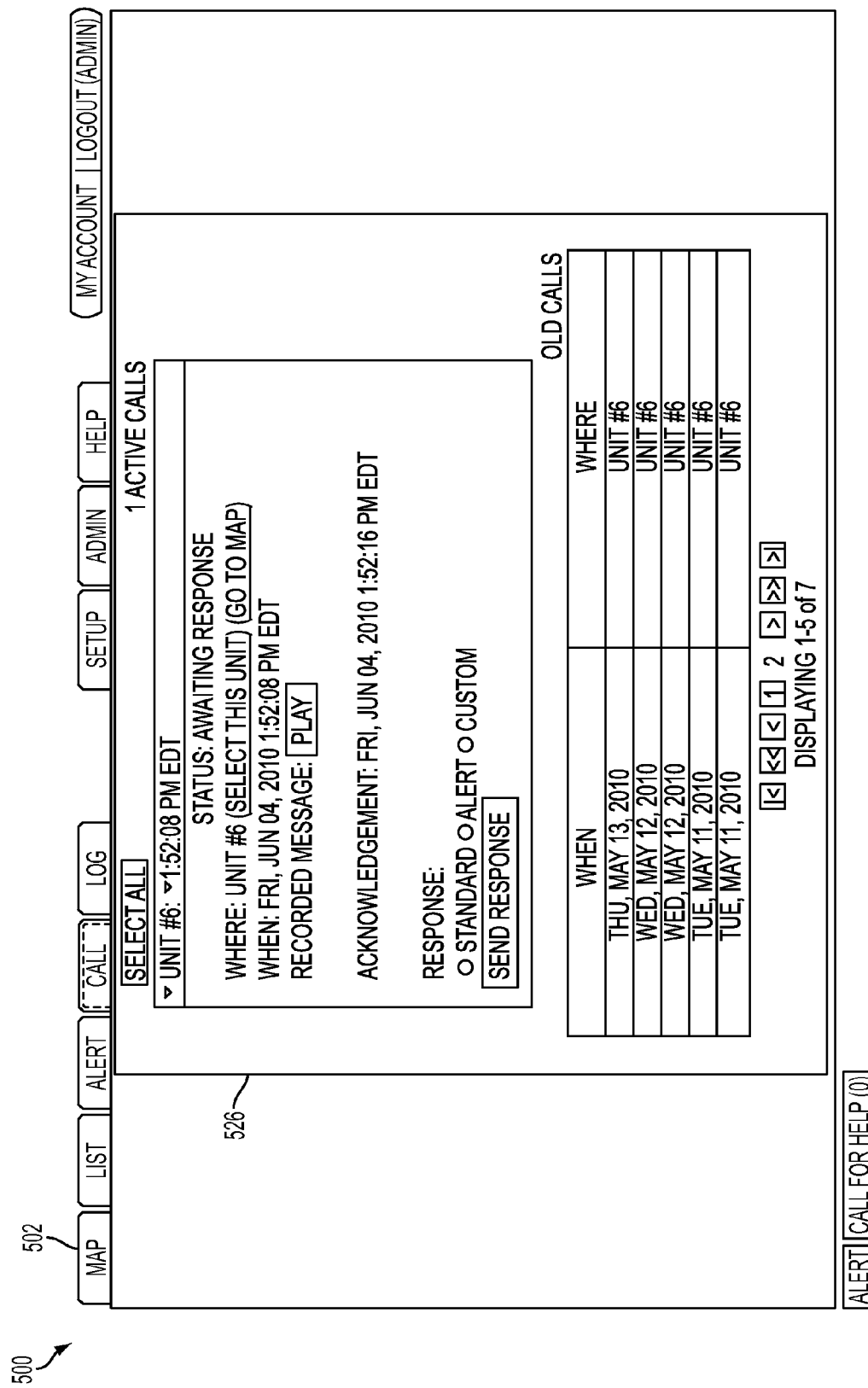

FIG. 5K illustrates an exemplary screenshot of user interface 500 when a user has selected the tab labeled "call" from the set of tabs 502. Any calls made to or from any notification units may be logged and listed in a call log list 526. The call log list 526 may include any active calls and information related to those active calls along with any information related to older calls such as where did the call originate from and when did the call occur. This information may be stored in a database (e.g., databases 120a, 120b).

Figure 5L:
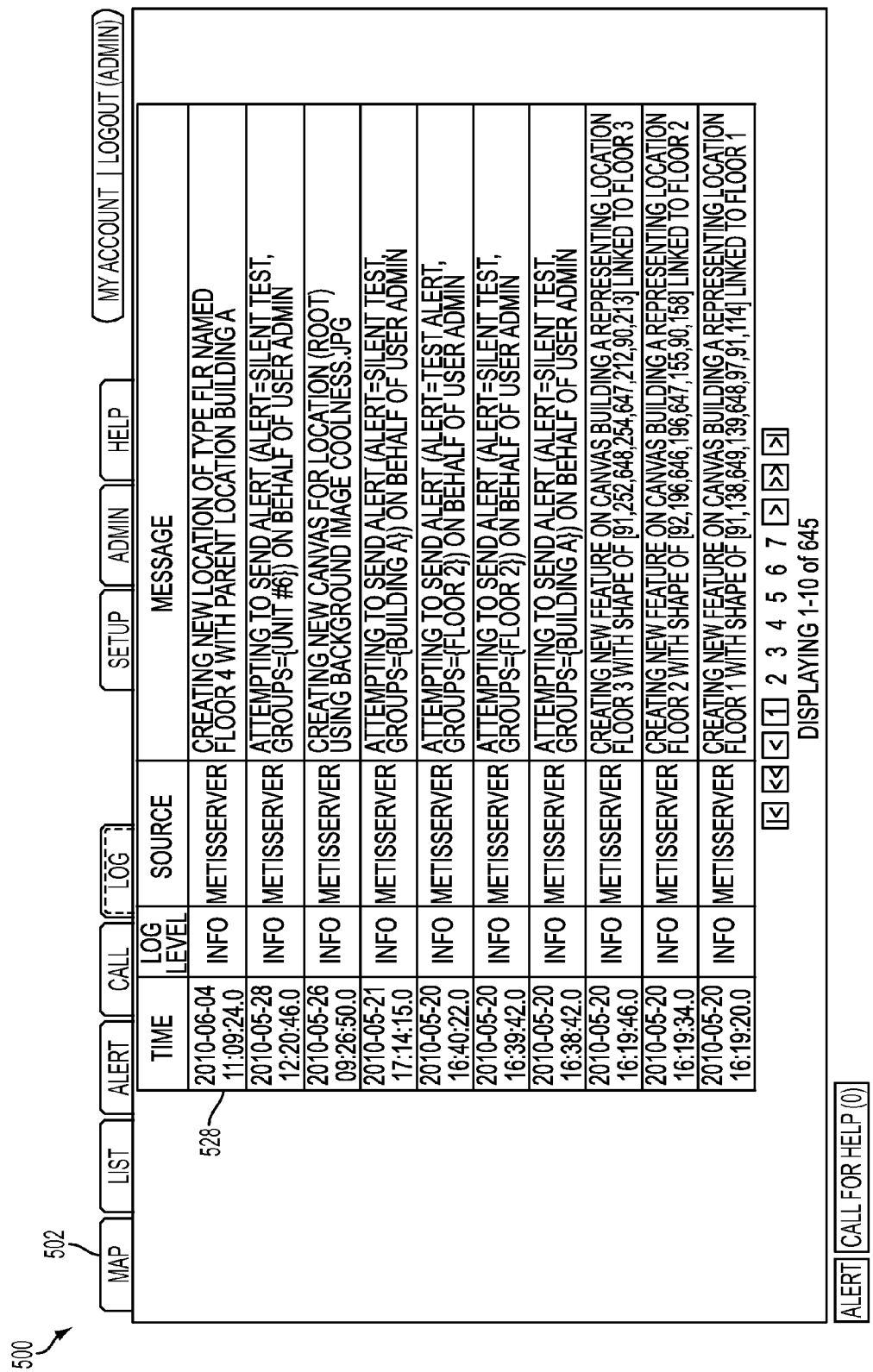

Similar to the listing of active and historic calls as shown in FIG. 5K, after an emergency notification has been sent, the user interface 500 may display a log of the notification when the tab labeled "log" is selected from the set of tabs 502. FIG. 5L illustrates an exemplary history window 528 showing various pieces of information relating the alert, such as when was the message sent, where was it sent from, what was contained in the message, and any other information that may be logged relating to the notification. This information may be stored in a database (e.g., databases 120a, 120b).

It should be noted that the user interface 500 illustrated and discussed in reference to FIGS. 5A-L is shown by way of example only. Additional features may be included, such as unit specific monitoring, direct audio input to be transmitted via the FM signal, video access if cameras are installed near units, and any other features that may be included based upon the implementation of the related emergency notification system.

Figure 6:
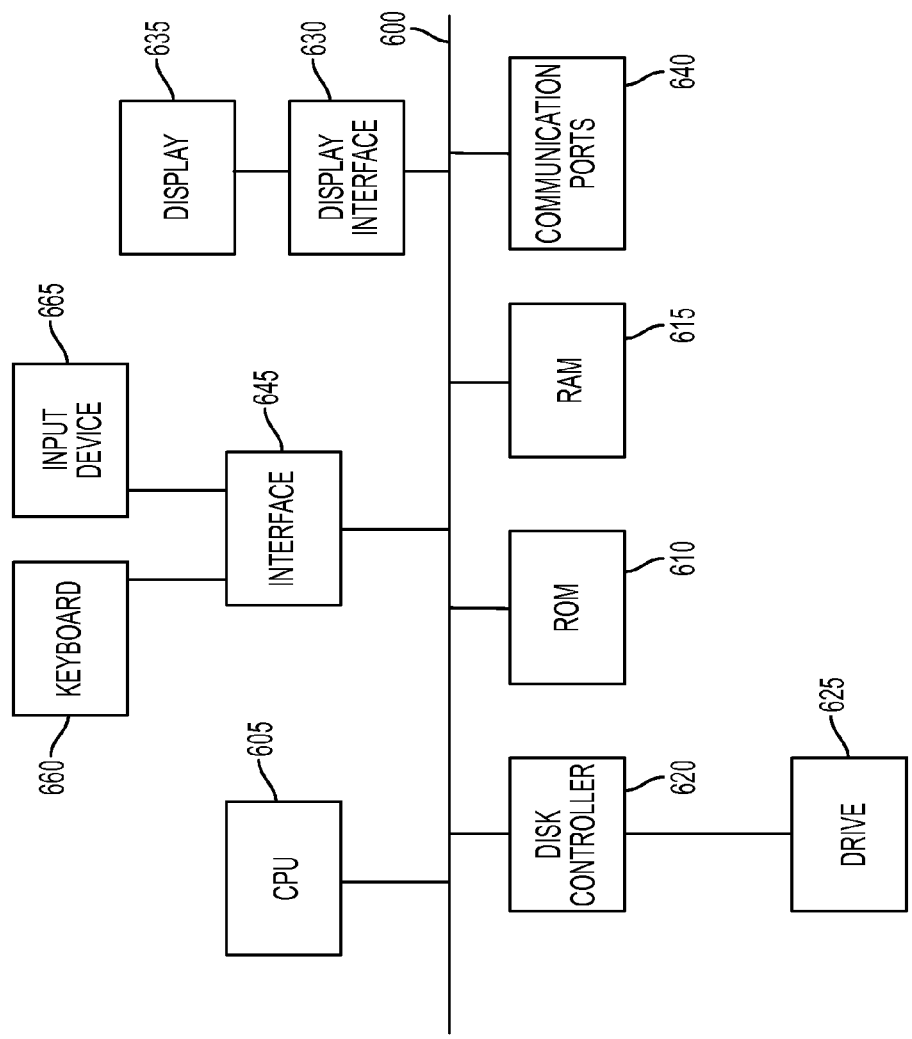
FIG. 6 is a block diagram illustrating an exemplary embodiment of a computing device for implementing various methods and processes described herein.

The user interface described above may be presented on a display based on computer-readable instructions that are stored on a computer readable medium such as a hard drive, disk, memory card, USB drive, or other recording medium. FIG. 6 depicts a block diagram of exemplary internal hardware that may be used to contain or implement program instructions such as the software modules discussed above in reference to FIGS. 5A-5L. A bus 600 serves as the main information highway interconnecting the other illustrated components of the hardware. CPU 605 is the central processing unit of the system, performing calculations and logic operations required to execute a program. Read only memory (ROM) 610 and random access memory (RAM) 615 constitute exemplary memory devices.

A controller 620 interfaces with one or more optional memory devices 625 to the system bus 600. These memory devices 625 may include, for example, an external or internal DVD drive, a CD ROM drive, a hard drive, flash memory, a USB drive or the like. As indicated previously, these various drives and controllers are optional devices.

Program instructions may be stored in the ROM 610 and/or the RAM 615. Optionally, program instructions may be stored on a tangible computer readable medium such as a compact disk, a digital disk, flash memory, a memory card, a USB drive, an optical disc storage medium, such as Blu-ray™ disc, and/or other recording medium.

An optional display interface 630 may permit information from the bus 600 to be displayed on the display 635 in audio, visual, graphic or alphanumeric format. Communication with external devices may occur using various communication ports 640. An exemplary communication port 640 may be attached to a communications network, such as the Internet or an intranet.

The hardware may also include an interface 645 which allows for receipt of data from input devices such as a keyboard 650 or other input device 655 such as a mouse, a joystick, a touch screen, a remote control, a pointing device, a video input device and/or an audio input device.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A user interface for interacting with an emergency notification system comprising:
    at least one software module installed on a non-transitory computer readable medium and containing instructions for operating a computer processor, the instructions comprising:
        first instructions for causing the processor to display on a computing device display a user interface window configured to receive a user entered alert message using an alert selection window wherein the user interface window comprises:
            a set or one or more tabs indicating various functions that are based upon a role of user accessing the emergency notification system that, in response to a user selection, are performed by the processor,
            a first user selectable area comprising a data structure representing a listing of devices associated with the emergency notification system,
            a second user selectable area located adjacent to the first user selectable area and comprising a user selectable visual representation of the devices associated with the emergency notification system, and
            a third user selectable area located within the first user selectable area, the third user selectable area comprising a system information window including a text based representation of additional information related with one or more notification units associated with the emergency notification system;
        second instructions for causing the processor to display on the computing device display within the second user selectable area, a map of a geographic area covered by the notification system, wherein the map comprises information related to status information for the one or more notification units;
        third instructions for causing the processor to display on the computing device display, in response to a user selection to send an alert, an alert selection window configured to allow the user to separately enter an alert message and an audible alert, wherein output of the audible alert is directed to a speaker;
        fourth instructions for causing the processor to display on the computing device display a group selection window within the first user selectable area and configured to receive a user selection of the one or more notification units to receive the alert message wherein the processor is further configured to update the second user selectable area in response to a user selection of one or more notification units to receive the alert message; and
        fifth instructions for causing the processor to display on the computer device display a selection button for instructing the processor, upon selection, to transmit the alert message to the selected one or more notification units, wherein the processor is further configured to update the map in response to the alert message such that the map indicates a current status of the devices.

2. The user interface of claim 1, further comprising sixth instructions for causing the processor to receive the alert message based upon a user selected alert message selected from a listing of alert messages to be transmitted as the alert message, or a user entered custom alert message to be transmitted as the alert message.

3. The user interface of claim 2, wherein the custom alert message comprises: a text message to be displayed on the one or more notification units; and a spoken text message to be emitted via a speaker on the one or more notification units.

4. The user interface of claim 1, wherein the group selection window is configured such that, in response to a user selection of a group to receive the alert message, a sub-set of the selected group is displayed to the user for additional selection.

5. The user interface of claim 1, further comprising sixth instructions for causing the processor to alter a view of the map in response to receiving a user command to alter the view of the map.

6. The user interface of claim 1, further comprising sixth instructions for causing the processor to display user selectable portions on the map and additional detail related to the user selectable portions in response to a user selection of a user selectable portion.

7. The user interface of claim 6, wherein the user selectable portions comprise at least one of one or more buildings, a floor of a building, and one or more notification units.

8. The user interface of claim 6, further comprising seventh instructions for causing the processor to display on the computer device display a map setup toolbar thereby enabling a user to define the one or more user selectable portions of the map.

9. The user interface of claim 1, further comprising sixth instructions for causing the process to display a historical log related to alert messages.

10. The user interface of claim 1, further comprising sixth instructions for causing the processor to display a user authentication window in response to selection of the selection button and prior to transmitting the entered alert message.

11. The user interface of claim 1, wherein the various functions comprise at least one of view a map, list notification devices, send an alert, view a call log, view an alert log, enter setup mode, and enter administrator mode.

12. The user interface of claim 11, further comprising sixth instructions for causing the processor to modify the set of one or more tabs to display a subset of the various activities depending on a security level of a user accessing the user interface.

* * * * *